United States Patent
Kim et al.

(10) Patent No.: US 12,339,964 B2
(45) Date of Patent: Jun. 24, 2025

(54) BINARY FILE FEATURE INFORMATION EXTRACTION THROUGH BINARY FILE IMMOBILIZATION AND WAVELET SIGNAL PROCESSING

(71) Applicant: Korea University Research and Business Foundation, Seoul (KR)

(72) Inventors: Huy Kang Kim, Seoul (KR); Sang Min Park, Namyangju-si (KR); Sang Hoon Jeon, Suwon-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 18/008,531

(22) PCT Filed: Jul. 15, 2022

(86) PCT No.: PCT/KR2022/010370
§ 371 (c)(1),
(2) Date: Dec. 6, 2022

(87) PCT Pub. No.: WO2023/038273
PCT Pub. Date: Mar. 16, 2023

(65) Prior Publication Data
US 2024/0256664 A1    Aug. 1, 2024

(30) Foreign Application Priority Data

Sep. 8, 2021   (KR) .................. 10-2021-0119714
Nov. 25, 2021  (KR) .................. 10-2021-0163930

(51) Int. Cl.
*G06F 21/56*        (2013.01)

(52) U.S. Cl.
CPC .................... *G06F 21/563* (2013.01)

(58) Field of Classification Search
CPC ........................................ G06F 21/563
See application file for complete search history.

(56) References Cited

U.S. PATENT DOCUMENTS 10,089,460 B2 *  10/2018  Moon .................. G06F 21/552
2014/0122087 A1 *  5/2014  Macho ................... G10L 15/22
                                                            704/275

(Continued)

FOREIGN PATENT DOCUMENTS

JP       2012-160047 A    8/2012
KR      10-1716564 B1    3/2017

(Continued)

OTHER PUBLICATIONS

Shafiq, M. Zubair, et al., "Embedded malware detection using markov n-grams." Detection of Intrusions and Malware, and Vulnerability Assessment: 5th International Conference, DIMVA 2008, Paris, France, Jul. 10-11, 2008. Proceedings 5. Springer Berlin Heidelberg, (20 pages in English).

(Continued)

*Primary Examiner* — Viet D Vu
(74) *Attorney, Agent, or Firm* — NSIP Law

(57) ABSTRACT

Disclosed is a method of extracting file feature information, the method being performed by a computing device including at least one processor, the method including: converting input data in a form of a binary file into data with a preset size; and extracting feature information of the input data from the data with the preset size. The representative drawing may be FIG. 2.

13 Claims, 8 Drawing Sheets

(56) References Cited

U.S. PATENT DOCUMENTS

| | | | |
|---|---|---|---|
| 2019/0007434 A1* | 1/2019 | McLane | G06N 3/045 |
| 2019/0190926 A1* | 6/2019 | Choi | H04L 63/1425 |
| 2020/0045063 A1* | 2/2020 | Zhang | H04L 63/1416 |
| 2020/0218806 A1 | 7/2020 | Cho | |
| 2021/0118146 A1* | 4/2021 | Rhodes | G06N 3/045 |

FOREIGN PATENT DOCUMENTS

| | | |
|---|---|---|
| KR | 10-2019-0003202 A | 1/2019 |
| KR | 10-2185831 B1 | 12/2020 |
| KR | 10-2021-0067709 A | 6/2021 |

OTHER PUBLICATIONS

Makandar, Aziz, et al., "Malware class recognition using image processing techniques." 2017 International Conference on Data Management, Analytics and Innovation (ICDMAI). IEEE, 2017, (5 pages in English).

Korean Office Action issued on Mar. 4, 2023, in counterpart Korean Patent Application No. 10-2021-0163930 (5 pages in Korean).

European Office Action issue don Nov. 8, 2024 in corresponding European Patent Application No. 22867542.7 (10 pages in English).

Kancherla, Kesav, et al. "Image visualization based malware detection." *2013 IEEE symposium on computational intelligence in cyber security (CICS)*. IEEE, Sep. 16, 2013, pp. 1-2.

Makandar, Aziz, et al. "Malware class recognition using image processing techniques." *2017 International Conference on Data Management, Analytics and Innovation (ICDMAI)*. IEEE, Oct. 19, 2017, pp. 1-2.

Pinhero, Anson, et al. "Malware detection employed by visualization and deep neural network." *Computers & Security* vol. 105 (Jun. 2021): pp. 1-16.

Japanese Office Action issued on Jan. 28, 2025 in corresponding Japanese Patent Application No. 2024-514694. (5 pages in Japanese).

* cited by examiner

[FIG. 1]
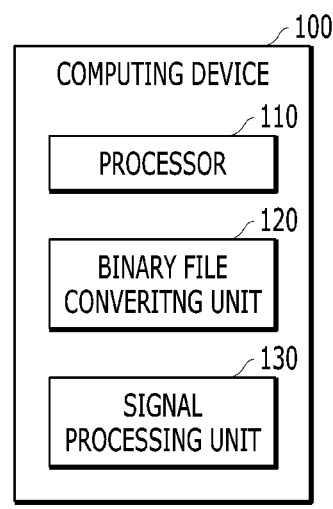

[FIG. 2]
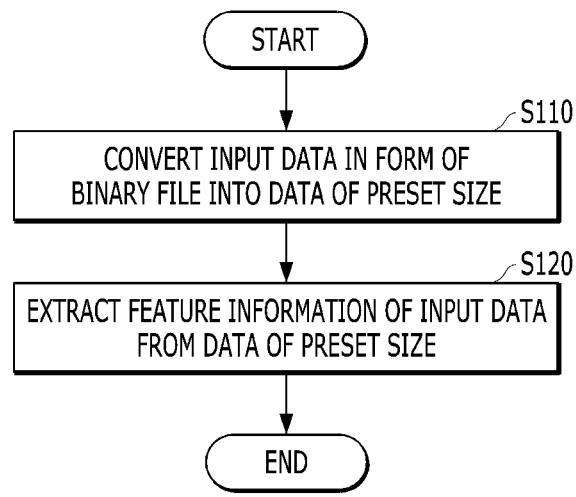

[FIG. 3]
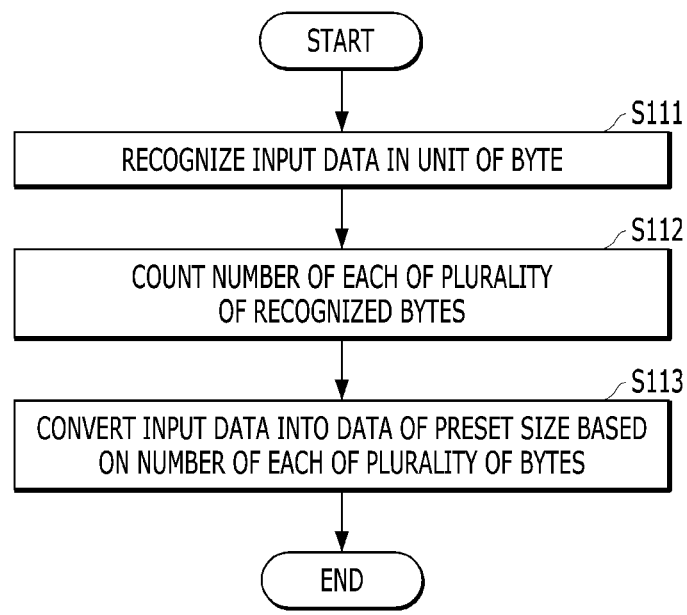

[FIG. 4]
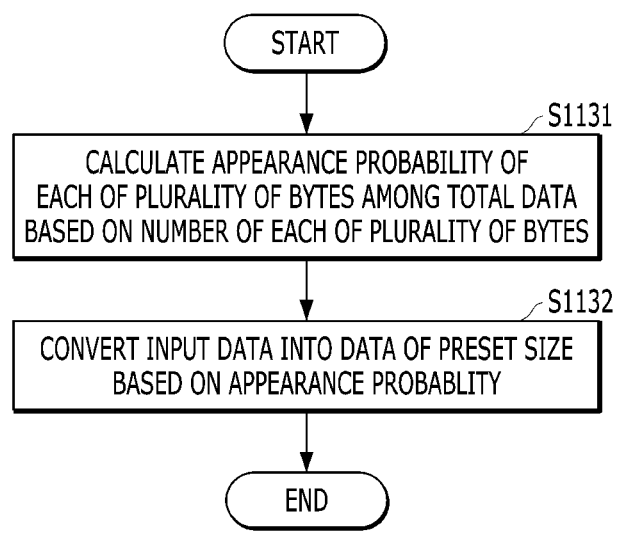

[FIG. 5]
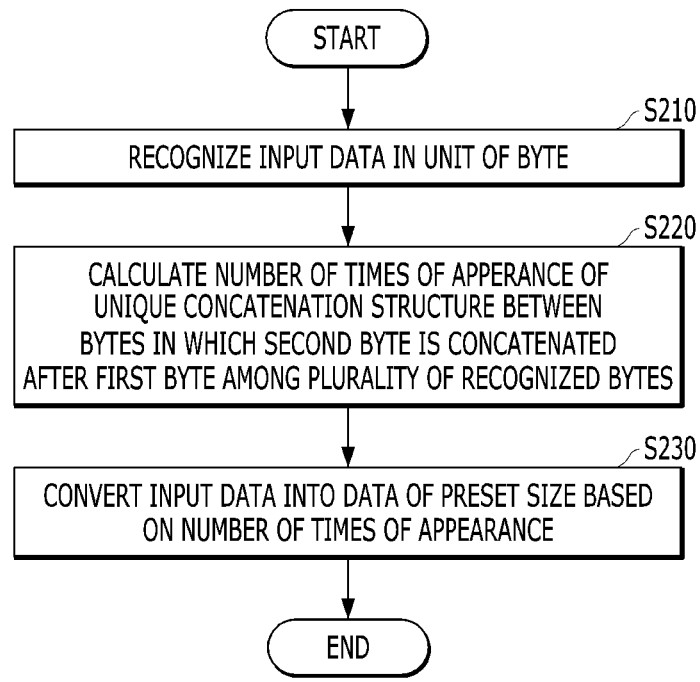

[FIG. 6]
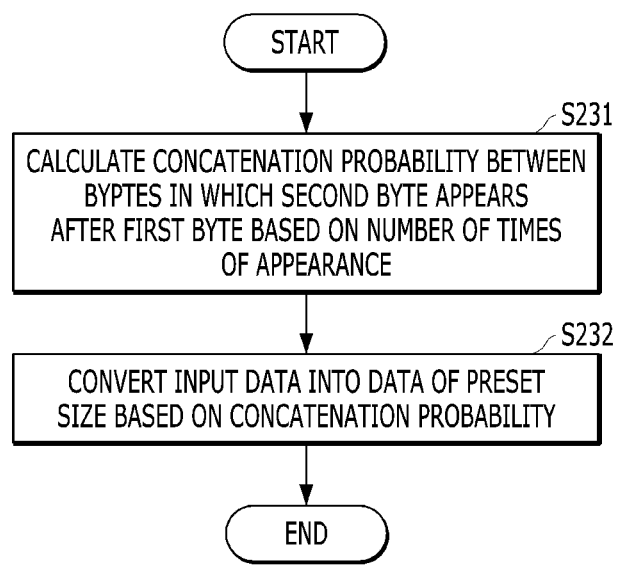

[FIG. 7]
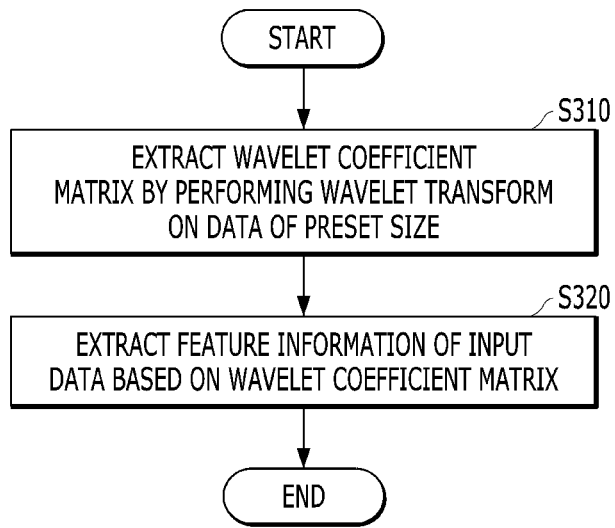

[FIG. 8]
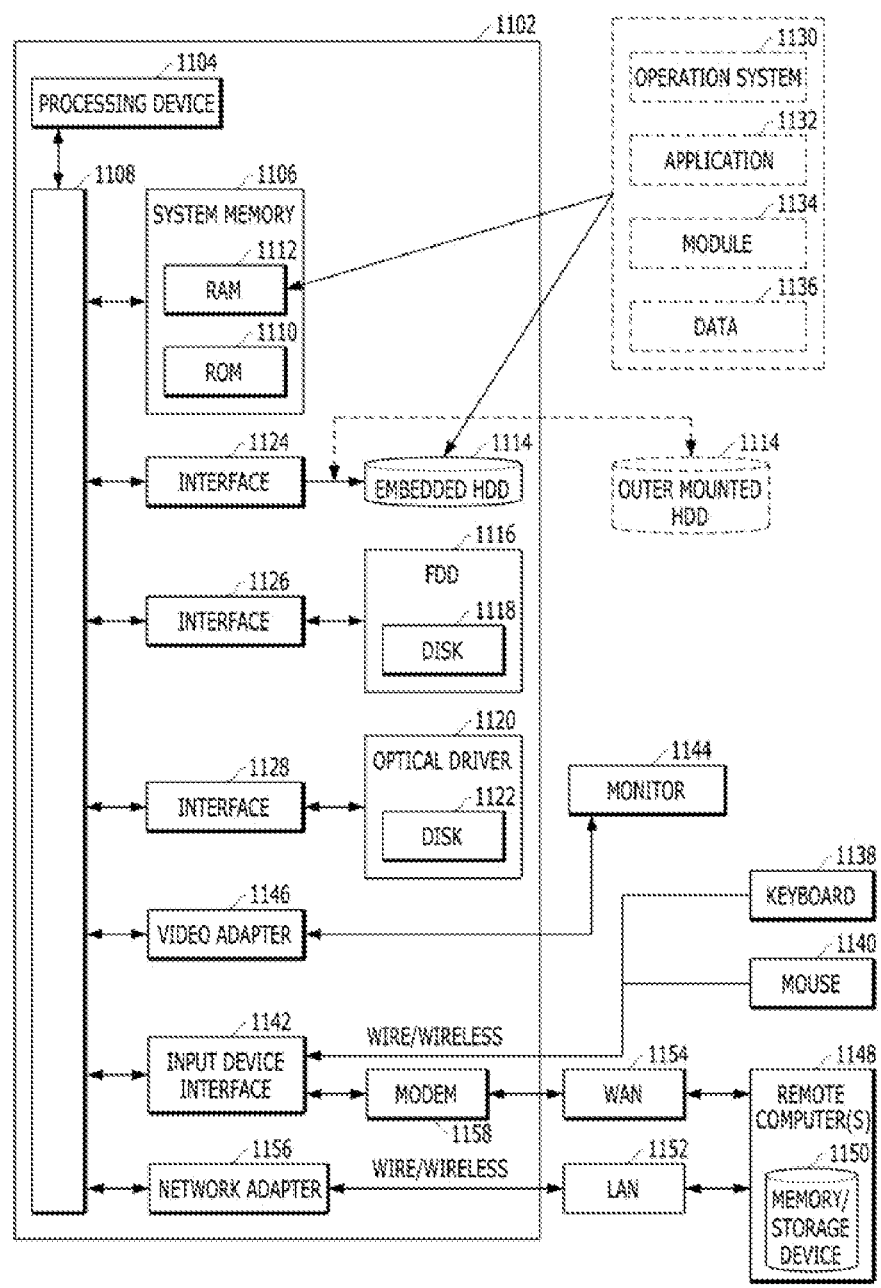

BINARY FILE FEATURE INFORMATION EXTRACTION THROUGH BINARY FILE IMMOBILIZATION AND WAVELET SIGNAL PROCESSING

CROSS REFERENCE TO RELATED APPLICATIONS

This application is a U.S. National Stage Application of International Application No. PCT/KR2022/010370, filed on Jul. 15, 2022, which claims the benefit under 35 USC 119(a) and 365(b) of Korean Patent Application No. 10-2021-0119714 filed on Sep. 8, 2021 and Korean Patent Application No. 10-2021-0163930 filed on Nov. 25, 2021, in the Korean Intellectual Property Office, the entire disclosures of which are incorporated herein by reference for all purposes.

TECHNICAL FIELD

The present disclosure relates to malicious code detection, and more particularly, to a method of converting a binary file into data of a fixed size and then statically extracting feature information through wavelet signal processing.

BACKGROUND ART

Since a large amount of malicious code is distributed in cyberspace around the world, there is a need to quickly extract feature information of a binary file to detect whether the binary file is a malicious code.

However, depending on the operating system environment, the binary file may have a structure, such as PE (Portable Executable) or ELF (Executable and Linkable Format). Accordingly, in order to extract feature information from binary files, different feature information extraction processes may be required according to the structure of the corresponding binary file. In addition, when feature information is extracted from a binary file to which packing and obfuscation is not applied and a binary file to which packing and obfuscation are applied, there may be a limitation in that it is difficult to extract meaningful feature information from a binary file to which packing and obfuscation are applied. In addition, in order to extract feature information for a binary file, it may be necessary to perform a data conversion process, such as imaging, grayscale, and arrangement, of the binary file. However, when a binary file is converted, the shape of the converted binary file is not fixed due to different binary file sizes, and accordingly, there may be a limit to extract feature information of a uniform level from binary files of different sizes. In addition, when feature information is extracted from a binary file through wavelet signal processing, there may be a problem that the extracted feature information is not the same according to the size of the binary file.

DISCLOSURE

Technical Problem

The present disclosure has been conceived in response to the foregoing background art, and has been made in an effort to detect whether a binary file is a malicious code by using feature information extracted through a static feature information extraction process in order to quickly extract feature information of a binary file.

The present disclosure has also been conceived in response to the foregoing background art, and has been made in an effort to extract feature information through one feature information extraction process for all binary files regardless of the structure of the binary file according to an operating system environment.

The present disclosure has also been conceived in response to the foregoing background art, and has been made in an effort to extract meaningful binary file feature information at a uniform level from a binary file to which packing and obfuscation is not applied and a binary file to which packing and obfuscation are applied.

The present disclosure has also been conceived in response to the foregoing background art, and has been made in an effort to create fixed-size data by using methods, such as padding, slicing, histogram, and hidden Markov, for a binary file.

The present disclosure has also been conceived in response to the foregoing background art, and has been made in an effort to convert binary files having different sizes into data of a fixed form by reading the binary file in the unit of byte by applying the hidden Markov concept and arranging probability values for the case where a next byte is concatenated after a current byte.

The present disclosure has also been conceived in response to the foregoing background art, and has been made in an effort to extract feature information that is meaningful in detecting malicious codes through wavelet signal processing from binary files of different sizes converted into data of a fixed form.

The technical objects of the present disclosure are not limited to the foregoing technical objects, and other non-mentioned technical objects will be clearly understood by those skilled in the art from the description below.

Technical Solution

In order to solve the foregoing object, an exemplary embodiment of the present disclosure discloses a method of extracting file feature information, the method being performed by a computing device including at least one processor, the method comprising: converting input data in a form of a binary file into data with a preset size; and extracting feature information of the input data from the data with the preset size.

Further, the converting of the input data in the form of the binary file into the data with the preset size may include converting the input data into the data with the preset size by using a hidden Markov model.

Further, the converting of the input data in the form of the binary file into the data with the preset size may include: recognizing the input data by dividing the input data by a first unit indicating a size of a storage device; counting the number of data recognized by the first unit; and converting the input data into the data with the preset size based on the number of data in the first unit.

Further, the converting of the input data in the form of the binary file into the data with the preset size may include: recognizing the input data in units of bytes; counting the number of each of the recognized plurality of bytes; and converting the input the data into data with the preset size based on the number of each of the plurality of bytes.

Further, the converting of the input data into the data with the preset size based on the number of each of the plurality of bytes may include: calculating an appearance probability of each of the plurality of bytes in total data based on the number of each of the plurality of bytes; and converting the input data into the data with the preset size based on the appearance probability.

Further, the converting of the input data in the form of the binary file into the data with the preset size may include: recognizing the input data in units of bytes; calculating the number of times of appearance of a unique concatenation structure between bytes in which a second byte is concatenated after a first byte among a plurality of recognized bytes, in which the number of times of the appearance is calculated for at least some of the recognized plurality of bytes; and converting the input data into the data with the preset size based on the number of times of the appearance.

Further, the converting of the input data into the data with the preset size based on the number of times of the appearance may include: calculating a concatenation probability between bytes, in which the second byte appears after the first byte, based on the number of times of the appearance; and converting the input data into data with the preset size based on the concatenation probability.

Further, the extracting of the feature information of the input data from the data with the preset size may include extracting feature information from the data with the preset size by using a wavelet transform technique.

Further, the extracting of the feature information from the data with the preset size by using the wavelet transform technique may include: extracting a wavelet coefficient matrix by performing the wavelet transform on the data with the preset size, in which the wavelet coefficient matrix includes an approximation coefficient matrix and a detail coefficient matrix; and extracting feature information of the input data based on the wavelet coefficient matrix.

Further, the detailed coefficient matrix may include at least one of a horizontal coefficient matrix, a vertical coefficient matrix, or a diagonal coefficient matrix.

Further, the data with the preset size may be data having a matrix structure, and the feature information may include at least one of a first feature related to the approximate coefficient matrix extracted by performing a first number of times of the wavelet transform, a second feature for the diagonal coefficient matrix value extracted by performing a second number of times of the wavelet transform within a first number range equal to or greater than a first threshold number of times and equal to or less than the first number of times, a third feature related to the diagonal coefficient matrix extracted by performing a third number of times of the wavelet transform within a second number range equal to or greater than a first threshold number of times and less than the first number of times, and a fourth feature related to the diagonal coefficient matrix extracted by performing a fourth number of times of the wavelet transform within a third number range equal to or greater than a second threshold number of times less than the first threshold number of times and less than the first number of times, so that the data with the preset size has a 1×1 matrix structure, and the first threshold number of times may be smaller than the first number of times.

Further, the third feature may include at least one of a third-1 feature related to a ratio of the diagonal coefficient matrix extracted by performing the wavelet transform the third number of times and a third-2 feature related to a first standard deviation of the diagonal coefficient matrix extracted by performing the wavelet transform the third number of times.

Further, the fourth feature may include at least one of a fourth-1 feature related to a sum of the values of the diagonal coefficient matrixes extracted by performing the wavelet transform the fourth number of times, a fourth-2 feature related to the degree of asymmetry of the value of the diagonal coefficient matrix extracted by performing the wavelet transform the third number of times, a fourth-3 feature related to a second standard deviation of the diagonal coefficient matrix extracted by performing the wavelet transform the third number of times, and a fourth-4 feature related to an average value of the diagonal coefficient matrixes extracted by performing the wavelet transform the third number of times.

Further, the method may further include training a network model using the feature information as training data to detect a malicious code from the input data in the form of the binary file.

In order to solve the foregoing object, another exemplary embodiment of the present disclosure discloses a computing device for extracting file feature information, the computing device including: a binary file converting unit for converting input data in a form of a binary file into data with a preset size; and a signal processing unit for extracting feature information of the input data from the data with the preset size.

In order to solve the foregoing object, another exemplary embodiment of the present disclosure discloses a non-transitory computer readable medium including a computer program, wherein the computer program performing a method of extracting feature information of a file when being executed by one or more processors, the method including: converting input data in a form of a binary file into data with a preset size; and extracting feature information of the input data from the data with the preset size.

The technical solutions obtainable from the present disclosure are not limited to the foregoing solutions, and other non-mentioned solution means will be clearly understood by those skilled in the art from the description below.

Advantageous Effects

It is possible to quickly detect whether a binary file is a malicious code by statically extracting feature information, and it is possible to remove the risk of malicious code infection by not executing the binary file.

Also, it is possible to extract feature information for all binary files regardless of an operating system environment.

Further, it is possible to extract a uniform level of feature information regardless of whether the binary file is packed or obfuscated.

Further, it is possible to extract a uniform level of feature information by converting a binary file input when feature information is extracted from the binary file into the data in the fixed form regardless of the different sizes of the binary file through the data conversion process in the present disclosure.

Furthermore, it is possible to extract feature information meaningful for malicious code detection through wavelet signal processing from data in a fixed format as a data conversion process.

The effects of the present disclosure are not limited to the foregoing effects, and other non-mentioned effects will be clearly understood by those skilled in the art from the description below.

DESCRIPTION OF DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters. In other examples, well-known structures and devices are illustrated in a block diagram in order to facilitate describing one or more aspects.

FIG. 1 is a block diagram illustrating an example of a computing device according to some exemplary embodiments of the present disclosure.

FIG. 2 is a flowchart illustrating an example of a method of extracting feature information of input data by the computing device according to some exemplary embodiments of the present disclosure.

FIG. 3 is a flowchart illustrating an example of a method of converting input data into data having a preset size based on the number of each of the bytes by the computing device according to some exemplary embodiments of the present disclosure.

FIG. 4 is a flowchart illustrating an example of a method of converting input data into data with a preset size based on an appearance probability of each of the bytes by the computing device according to some exemplary embodiments of the present disclosure.

FIG. 5 is a flowchart illustrating an example of a method of converting input data into data with a preset size based on the number of times of the appearance of a unique concatenation structure between bytes by the computing device according to some exemplary embodiments of the present disclosure.

FIG. 6 is a flowchart illustrating an example of a method of converting input data into data with a preset size based on a concatenation probability between bytes by the computing device according to some exemplary embodiments of the present disclosure.

FIG. 7 is a flowchart illustrating an example of a method of extracting the feature information from data with a preset size by the computing device by using a wavelet transform technique.

FIG. 8 is a general schematic diagram illustrating an example of a computing environment in which exemplary embodiments of the present disclosure may be implemented.

BEST MODE

Various exemplary embodiments and/or aspects are now disclosed with reference to the drawings. In the description below, the plurality of particular detailed matters are disclosed for helping general understanding of one or more aspects for the purpose of description. However, the point that the aspect(s) is executable even without the particular detailed matters may also be recognized by those skilled in the art. The subsequent description and the accompanying drawings describe specific illustrative aspects of one or more aspects in detail. However, the aspects are illustrative, and some of the various methods of various aspects of the principles may be used, and the descriptions intend to include all of the aspects and the equivalents thereof. In particular, an "exemplary embodiment", an "example", an "aspect", an "illustration", and the like used in the present specification may not be construed to be better or have an advantage compared to a predetermined described aspect, an aspect having a different design, or designs.

Hereinafter, the same or similar constituent element is denoted by the same reference numeral regardless of a reference numeral, and a repeated description thereof will be omitted. Further, in describing the exemplary embodiment disclosed in the present disclosure, when it is determined that a detailed description relating to well-known functions or configurations may make the subject matter of the exemplary embodiment disclosed in the present disclosure unnecessarily ambiguous, the detailed description will be omitted. Further, the accompanying drawings are provided for helping to easily understand exemplary embodiments disclosed in the present specification, and the technical spirit disclosed in the present specification is not limited by the accompanying drawings.

Although "a first", "a second", and the like are used for describing various elements or constituent elements, but the elements or the constituent elements are not limited by the terms. The terms are used for discriminating one element or constituent element from another element or constituent element. Accordingly, a first element or constituent element mentioned below may also be a second element or constituent element within the technical spirit of the present disclosure as a matter of course.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined specially.

Further, a term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

Further, a term "include" and/or "including" shall be understood as meaning that a corresponding characteristic and/or a constituent element exists, but it shall be understood that the existence or an addition of one or more other characteristics, constituent elements, and/or a group thereof is not excluded. Further, unless otherwise specified or when it is unclear in context that a single form is indicated, the singular shall be construed to generally mean "one or more" in the present specification and the claims.

In addition, terms "information" and "data" used in the present specification may be frequently used to be exchangeable with each other.

It should be understood that when one constituent element referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

Suffixes, "module" and "unit" for a constituent element used for the description below are given or mixed in consideration of only easiness of the writing of the specification, and the suffix itself does not have a discriminated meaning or role.

An object and effect of the present disclosure and technical configurations for achieving them will be apparent with reference to the exemplary embodiments described below in detail together with the accompanying drawings. In describing the present disclosure, when it is determined that detailed description of known function or configurations unnecessarily obscures the subject matter of the present disclosure, the detailed description may be omitted. Further, the terms used in the description are defined in consideration of the function in the present disclosure and may vary depending on an intention or usual practice of a user or operator.

However, the present disclosure is not limited to the exemplary embodiments disclosed below, but may be implemented in various different forms. However, the present exemplary embodiments are provided only to make the present disclosure complete, and to fully inform the scope of the disclosure to those skilled in the art, and the present disclosure is only defined by the scope of the claims. Accordingly, the definition should be made based on the content throughout the present specification.

In the present disclosure, the computing device may convert input data in the form of a binary file into data having a preset size. A binary file is an encoded file for the purpose of storing and processing data, and may have a different structure depending on the operating system environment. For example, a binary file in a Windows-based operating system may be in a Portable Executable (PE) format, and a binary file in a Unix-based operating system may be in an Executable and Linkable Format (ELF) format. Conventionally, feature information could be extracted from a binary file through different processes for each operating system environment. In this case, there may be a problem that the extracted feature information is not uniform. In the present disclosure, preprocessing may be performed on input data in the form of a binary file to be converted into data having a preset size. The preprocessing performed in the present disclosure may be the same preprocessing regardless of the operating system environment. Accordingly, when the feature information of the input data is extracted from the converted data with the preset size, the uniformity of the extracted feature information may be guaranteed. In addition, the computing device may statically extract the feature information without executing the binary file. Accordingly, the risk of malicious infection may also be removed. Hereinafter, a method of extracting file feature information by a computing device will be described with reference to FIGS. 1 to 7.

FIG. 1 is a block diagram illustrating an example of a computing device according to some exemplary embodiments of the present disclosure.

Referring to FIG. 1, a computing device 100 may include a processor 110, a binary file converting unit 120, and a signal processing unit 130. However, since the above-described components are not essential in implementing the computing device 100, the computing device 1000 may include more or fewer components than those listed above.

The computing device 100 may include any type of computer system or computer device, such as, for example, a microprocessor, a mainframe computer, a digital processor, a portable device or a device controller, and the like.

The processor 110 may typically process the overall operation of the computing device 100. The processor 110 may process signals, data, information, and the like input or output through constituent components included in the computing device 100 or drives an application program stored in a storage unit, thereby providing or processing appropriate information or functions to the user.

The binary file converting unit 120 may convert input data in the form of a binary file into data with a preset size. Data with a preset size may be data of a matrix structure. For example, the data with the preset size may be data of a matrix structure having a size of 256×256. However, the data with the preset size is not limited thereto, and may be data of a matrix structure having various sizes. For example, the data with the preset size may be data of a matrix structure having a size of 512×512 or data of a matrix structure having a size of 128×128.

According to some exemplary embodiments of the present disclosure, the binary file converting unit 120 may recognize the input data by dividing the input data by a first unit indicating the size of the storage device in order to convert the input data into data with a preset size. In one exemplary embodiment, the first unit may include a storage unit of the computing device. The first unit may be, for example, a unit, such as a byte, a page, a block, or a bit. The binary file converting unit 120 may count the number of data recognized by the first unit. The binary file converting unit 120 may convert the input data into data with a preset size based on the number of data recognized by the first unit.

According to some exemplary embodiments of the present disclosure, the binary file converting unit 120 may include a binary file reading unit, a byte probability calculator, and a fixed data generator.

The binary file reading unit may recognize input data in the form of a binary file by dividing the input data by the first unit. For example, the binary file reading unit may recognize input data in the form of the binary file by dividing the input data in units of bytes.

The byte probability calculator may count the number of each of a plurality of recognized bytes when input data is recognized in units of bytes through the binary file reading unit. The byte probability calculator may calculate an appearance probability of each of the plurality of bytes in the total data based on the number of each of the plurality of bytes. The appearance probability may be a probability indicating how much each of the plurality of bytes appears in the total data. As an example, a first appearance probability calculated for a first byte among the plurality of bytes may be a value that may represent a ratio of the first byte among the plurality of bytes.

The fixed data generator may convert the input data into data with a preset size based on the appearance probability calculated through the byte probability calculator. Hereinafter, an example of a method in which the binary file converting unit 120 converts input data in the form of a binary file into data having a preset size will be described with reference to FIGS. 2 to 6.

Meanwhile, the signal processing unit 130 may extract feature information of the input data from data with a preset size. The feature information may be information used to detect whether input data in the form of a binary file is malicious code.

For example, the processor 110 may train a network model to detect a malicious code from input data in the form of a binary file by using the extracted feature information as training data. When a network model is trained by using the feature information extracted according to the method according to the present disclosure as training data, it is demonstrated as represented in Tables 1 to 3 below that the trained network model is capable of detecting malicious codes with high accuracy.

TABLE 1

| | precision | recall | F1-score | Support |
|---|---|---|---|---|
| 0 | 0.9214 | 0.8845 | 0.9026 | 1,671 |
| 1 | 0.9552 | 0.9703 | 0.9627 | 4,237 |

TABLE 1-continued

|  | precision | recall | F1-score | Support |
|---|---|---|---|---|
| Macro avg | 0.9383 | 0.9274 | 0.9326 | 5,908 |
| Weighted avg | 0.9456 | 0.9460 | 0.9457 | 5,908 |

TABLE 2

|  | precision | recall | F1-score | Support |
|---|---|---|---|---|
| 0 | 0.9354 | 0.8934 | 0.9139 | 2,870 |
| 1 | 0.9573 | 0.9749 | 0.9660 | 7,041 |
| Macro avg | 0.9464 | 0.9341 | 0.9400 | 9,911 |
| Weighted avg | 0.9510 | 0.9513 | 0.9509 | 9,911 |

TABLE 3

|  | precision | recall | F1-score | Support |
|---|---|---|---|---|
| 0 | 0.9577 | 0.9589 | 0.9583 | 3,214 |
| 1 | 0.9702 | 0.9693 | 0.9697 | 4,427 |
| Macro avg | 0.9639 | 0.9641 | 0.9640 | 7,641 |
| Weighted avg | 0.9649 | 0.9649 | 0.9649 | 7,641 |

Table 1 may be a performance evaluation result for KISA 2017 malicious data. Table 2 may be a performance evaluation result for KISA 2018 malicious data. Table 3 may be a performance evaluation result for KISA 2019 malicious data. The KISA malicious code may be data provided by the Korea Internet & Security Agency. In Tables 1 to 3, 0 may be a benign code, and 1 may be a malicious code. Macro AVG may be a value obtained after calculating and adding TP (True Positive), FN (False Negative), FP (False Positive), and TN (True Negative). The weighted AVG may be an average value obtained by giving a preset weight to the number of data corresponding to each class.

Referring to Table 1, it can be seen that the accuracy is 0.9460, and the Area Under the Curve (AUC) score is 0.9274. Referring to Table 2, it can be seen that the accuracy is 0.9513 and the AUC Score is 0.9341. Referring to Table 3, it can be seen that the accuracy is 0.9649 and the AUC Score is 0.9641.

The accuracy may be a value calculated as in Equation 1 below, and as the accuracy is higher, the model may be evaluated to have higher performance.

$$\frac{TP + TN}{TP + FP + TN + FN} \quad \text{[Equation 1]}$$

The AUC score is a value corresponding to the area below the Receiver Operating Characteristic (ROC) curve, and the higher AUC score may mean that the model predicted the malicious code with good performance.

As shown in Tables 1 to 3, when a network model is trained by using the feature information extracted according to the method according to the present disclosure as training data, the trained network model may detect and predict malicious codes with high accuracy.

On the other hand, in the present disclosure, a network model trained by using feature information as training data is a Convolutional Neural Network (CNN), an Artificial Neural Network (ANN), a Deep Neural Network (DNN), or a Recurrent Neural Network (RNN).

Hereinafter, a method of extracting feature information of input data by the computing device 100 according to the present disclosure will be described.

FIG. 2 is a flowchart illustrating an example of a method of extracting feature information of input data by the computing device according to some exemplary embodiments of the present disclosure.

Referring to FIG. 2, the binary file converting unit 120 of the computing device 100 may convert input data in the form of a binary file into data with a preset size (S110).

According to the exemplary embodiment, the binary file converting unit 120 may recognize the input data by dividing the input data into a first unit indicating the size of the storage device. The binary file converting unit 120 may count the number of recognized first unit data and convert the input data into data with a preset size based on the number of first unit data.

According to some exemplary embodiments of the present disclosure, the binary file converting unit 120 may convert the input data into data with a preset size by using a hidden Markov model. The Hidden Markov model is a statistical-based model, and when input data is recognized in units of bytes, the Hidden Markov model may be a model capable of transforming input data based on a concatenation probability between bytes. The concatenation probability may be a probability that a second byte appears after a first byte among the plurality of bytes and is concatenated. According to the exemplary embodiment, the binary file converting unit 120 may also convert input data into data with a preset size by using methods, such as padding, slicing, or histogram. Hereinafter, an example of the method in which the binary file converting unit 120 converts input data into data with a preset size by using the hidden Markov model will be described with reference to FIGS. 5 and 6.

The signal processing unit 130 may extract feature information of the input data from the data with the preset size (S120).

Specifically, the signal processing unit 130 may extract feature information from the data having the preset size by using a wavelet transform technique. The wavelet transform technique is a signal processing technique that may be used to extract information from various types of data, such as an audio signal, an image, or a moving picture, and may be a technique capable of time-frequency analysis. The wavelet transform may variably handle temporal or spatial transitions simultaneously by using a long-time interval for analysis of low-frequency information and a short-time interval for high-frequency information. A Fourier transform technique, which is another signal processing technique, may also analyze time-frequency, and may convert a function of time or space into time information or spatial frequency information. However, in the case of the Fourier transform technique, time information or spatial frequency information may be changed according to how a user sets a time axis. For example, in the Fourier technique, when a user sets a time axis so that a lot of time information is extracted, damage may appear in spatial information. Conversely, in the Fourier technique, when a user sets a time axis so that a lot of spatial information is extracted, damage may appear in time information. On the other hand, the wavelet transform may equally extract time information and spatial information, that is, the wavelet transform may solve the above-described disadvantages of the Fourier transform. Accordingly, in the present disclosure, feature information may be extracted from the data having the preset size by using the wavelet transform technique. Hereinafter, an example of a method in which the signal processing unit 130 extracts feature information from data with a preset size using a wavelet transform technique will be described with reference to FIG. 7.

According to the above-described configuration, the computing device 100 may convert input data in the form of different binary files according to the operating system environment into data having a preset size. In addition, the computing device may extract feature information of the input data from the data with the preset size. Accordingly, the computing device 100 may extract meaningful feature information at a uniform level even when data in different operating system environments are input.

Hereinafter, an example in which the computing device 100 converts input data into data with a preset size will be described in more detail.

FIG. 3 is a flowchart illustrating an example of a method of converting input data into data having a preset size based on the number of each of the bytes by the computing device according to some exemplary embodiments of the present disclosure. FIG. 4 is a flowchart illustrating an example of a method of converting input data into data with a preset size based on an appearance probability of each of the bytes by the computing device according to some exemplary embodiments of the present disclosure.

Referring to FIG. 3, the binary file converting unit 120 of the computing device 100 may recognize input data in units of bytes (S111).

For example, the input data in the form of a binary file may include values between 0 and 255. The binary file converting unit 120 may recognize each of the values between 0 and 255 in units of bytes. For example, the binary file converting unit 120 may recognize values between 0 and 255 in units of bytes, such as 0, 1, 2, 3, and the like.

The binary file converting unit 120 may count the number of each of the recognized plurality of bytes (S112).

For example, the binary file converting unit 120 may count the number of each of the plurality of bytes, such as how many values are 0, how many values are 1, and the like.

The binary file converting unit 120 may convert the input data into data with a preset size based on the number of each of the plurality of bytes (S113).

For example, the binary file converting unit 120 may convert the input data into data having a size corresponding to the number of each of the plurality of bytes.

Meanwhile, referring to FIG. 4, when the number of each of the plurality of bytes is counted, the binary file converting unit 120 may calculate an appearance probability of each of the plurality of bytes in the total data based on the number of each of the plurality of bytes (S1131). The appearance probability may be a probability indicating how much each of the plurality of bytes appears in the total data. As an example, a first appearance probability calculated for a first byte among the plurality of bytes may be a value that may represent a ratio of the first byte among the plurality of bytes.

For example, the binary file converting unit 120 may calculate what percentage of 0's appears, what percentage of 1's appears, or what percentage of 2's appear among the values between 0 and 255.

The binary file converting unit 120 may convert the input data into data with a preset size based on the appearance probability (1132).

For example, the binary file converting unit 120 may convert the input data into data having a size corresponding to the appearance probability of each of the plurality of bytes.

According to the above-described configuration, the computing device 100 may convert input data in the form of different binary files according to the operating system environment into data having a preset size. In other words, even if input data in the form of a different binary file is input according to an operating system environment, the computing device 100 may convert all of the input data into data having a uniform size. Accordingly, the feature information of the input data extracted by the computing device 100 may also be uniform.

Hereinafter, another example in which the computing device 100 converts input data into data with a preset size will be described.

FIG. 5 is a flowchart illustrating an example of a method of converting input data into data with a preset size based on the number of times of the appearance of a unique concatenation structure between bytes by the computing device according to some exemplary embodiments of the present disclosure. FIG. 6 is a flowchart illustrating an example of a method of converting input data into data with a preset size based on a concatenation probability between bytes by the computing device according to some exemplary embodiments of the present disclosure.

According to some exemplary embodiments of the present disclosure, the binary file converting unit 120 of the computing device 100 may convert input data into data with a preset size using a hidden Markov model. The hidden Markov model may be a model capable of converting input data based on a concatenation probability between bytes included in the input data. The concatenation probability may be a probability that a second byte appears after a first byte among the plurality of bytes and is concatenated.

Specifically, referring to FIG. 5, the binary file converting unit 120 may recognize the input data in units of bytes (S210).

The binary file converting unit 120 may calculate the number of times of the appearance of a unique concatenation structure between bytes, in which the second byte is concatenated after the first byte among the recognized plurality of bytes (S220). Here, the first byte and the second byte are separated for convenience of description and are not limited to specific bytes. As an example, the binary file converting unit 120 may calculate the number of times of the appearance for at least some of the recognized plurality of bytes.

The unique concatenation structure is a unique concatenation structure between at least two bytes, and may be understood to be distinct from a concatenation structure between other at least two bytes.

For example, the binary file converting unit 120 may determine that a structure in which a second byte having a value of 1 is concatenated after a first byte having a value of 0 is a unique concatenation structure. For example, the binary file converting unit 120 may determine that a structure in which a second byte having a value of 1 is concatenated after a first byte having a value of 0 is a unique concatenation structure. As another example, the binary file converting unit 120 may determine a structure in which a third byte having a value of 2 is concatenated after the second byte having a value of 1 as a unique concatenation structure.

The number of times of the appearance may indicate the number of times that the unique concatenation structure appears within the recognized plurality of bytes.

For example, the binary file converting unit 120 may calculate the number of times of the appearance of the unique concatenation structure in which the second byte having a value of 1 is concatenated after the first byte having a value of 0. As another example, the binary file converting unit 120 may calculate the number of times of the appearance of the unique concatenation structure in which the third byte having a value of 2 is concatenated after the second byte having a value of 1.

The binary file converting unit 120 may convert the input data into data with the preset size based on the number of times of the appearance of the unique concatenation structure between bytes (S230).

According to the exemplary embodiment, the binary file converting unit 120 may convert input data into data having a matrix structure having a size of 256×256. However, the preset size is not limited to the 256×256 size, and may be larger or smaller than the 256×256 size.

Meanwhile, referring to FIG. 6, the binary file converting unit 120 may calculate a concatenation probability between bytes, in which the second byte appears after the first byte, based on the number of times of the appearance of the unique concatenation structure between the bytes. (S231). The concatenation probability may be a probability that a second byte appears after a first byte among the plurality of bytes and is concatenated.

For example, the binary file converting unit 120 may calculate a concatenation probability that the second byte having a value of 1 appears after the first byte having a value of 0. The binary file converting unit 120 may calculate a concatenation probability that the third byte having a value of 2 appears after the second byte having a value of 1.

The binary file converting unit 120 may convert the input data into data with a preset size based on the concatenation probability (S231).

According to an exemplary embodiment, the binary file converting unit 120 may convert the input data into data having a matrix structure having a size of 256×256. However, the preset size is not limited to the 256×256 size, and may be larger or smaller than the 256×256 size.

According to the above-described configuration, the computing device 100 may convert input data in the form of different binary file according to the operating system environment into data having a preset size. Here, the data with the preset size may be data in a matrix structure. Accordingly, the computing device 100 may extract feature information from data with a preset size by using a wavelet transform technique. Hereinafter, a method of extracting feature information from data with a preset size by the computing device 100 by using a wavelet transform technique will be described.

FIG. 7 is a flowchart illustrating an example of a method of extracting the feature information from data with a preset size by the computing device by using a wavelet transform technique.

Referring to FIG. 7, the signal processing unit 130 of the computing device 100 may extract a wavelet coefficient matrix by performing wavelet transform on data having a preset size (S310). The wavelet coefficients may be coefficients obtained by performing wavelet transform on data. The wavelet coefficient matrix may be a matrix constructed by using wavelet coefficients.

The wavelet coefficient matrix may include an approximation coefficient matrix and a detail coefficient matrix. The approximation coefficient matrix may include information on a low frequency region of data having a preset size. The detailed coefficient matrix may include information on a high frequency region of data having a preset size.

According to some exemplary embodiments of the present disclosure, the detailed coefficient matrix may include at least one of a horizontal coefficient matrix, a vertical coefficient matrix, or a diagonal coefficient matrix. Accordingly, the detailed coefficient matrix may include at least one of information in a horizontal direction for a high-frequency region of data with a preset size, information in a vertical direction for a high-frequency region of data with a preset size, or information in a diagonal direction for a high-frequency region of data with a preset size.

The signal processing unit 130 may extract feature information of the input data based on the wavelet coefficient matrix (S320). The feature information may be information used to detect whether input data in the form of a binary file is malicious code.

The feature information may include a first feature related to an approximate coefficient matrix extracted by performing wavelet transform on a first number of times so that the data having the preset size has a 1×1 matrix structure. According to the exemplary embodiment, the data with the preset size may be data of a matrix structure having a size of 256×256. Accordingly, the signal processing unit 130 may perform the wavelet transform eight times so that the data having the preset size has a 1×1 matrix structure. However, the first number of times is not limited to eight times, and may be a number of times such that the data having the matrix structures having various sizes may have a 1×1 matrix structure. For example, when the data with the preset size is data of a matrix structure having a size of 512×512, the signal processing unit 130 may perform the wavelet transform nine times so that the data with the preset size has a 1×1 matrix structure.

The feature information may include a second feature for a diagonal coefficient matrix value extracted by performing the wavelet transform a second number of times within a first number range equal to or greater than a first threshold number of times and equal to or less than the first number of times. Here, the first threshold number of times may be the number of times smaller than the first number of times.

As an example, the first number of times may be eight times, and the first threshold number of times may be four times. In this case, the first number range may be eight to four times, and the second number of times may be eight times, seven times, six times, five times, and four times. Accordingly, the signal processing unit 130 may extract the second feature of the diagonal coefficient matrix value by performing the wavelet transform eight times, seven times, six times, five times, and four times on the data having the preset size.

As another example, the first number of times may be eight times, and the first threshold number of times may be seven times. In this case, the first number range may be eight to seven times, and the second number of times may be eight times and seven times. Accordingly, the signal processing unit 130 may extract the second feature of the diagonal coefficient matrix value by performing the wavelet transform eight times and seven times on the data having the preset size.

According to some exemplary embodiments of the present disclosure, the first threshold number of times may be determined based on the performance of the computing device 100. For example, when the performance of the computing device 100 is sufficient, the signal processing unit 130 may determine the first threshold number of times to be one time. When the first threshold number of times is one, the first number range may be from eight times to one time, such that the second number of times may be eight times, seven times, six times, five times, four times, three times, two times, and one time. The signal processing unit 130 may extract the diagonal coefficient matrix value by performing wavelet transform eight times, seven times, six times, five times, four times, three times, two times, and one time, and when the feature information of the input data is extracted based on the extracted diagonal coefficient matrix value, the number of feature information may be increased. Alternatively, the feature information may be more diverse. Accordingly, when the network model is trained by using the extracted feature information as training data, the performance of the trained network model may be improved.

As another example, when the performance of the computing device 100 is insufficient, the signal processing unit 130 may determine the first threshold number of times to be four times. In this case, the speed at which the signal processing unit 130 performs wavelet transform on the data with the preset size may be improved, and resources may be saved.

The feature information may include a third feature related to a diagonal coefficient matrix extracted by performing the wavelet transform a third number of times within a second number range equal to or greater than the first threshold number of times and less than the first number of times.

As an example, the first number of times may be eight times, and the first threshold number of times may be four times. In this case, the second number range may be seven times to four times, and the third number of times may be seven times, six times, five times, and four times. Accordingly, the signal processing unit 130 may extract the third feature related to the diagonal coefficient matrix by performing the wavelet transform seven times, six times, five times, and four times on the data with the preset size.

As another example, the first number of times may be eight times, and the first threshold number of times may be six times. In this case, the second number range may be seven to six times, and the third number of times may be seven times and six times. Accordingly, the signal processing unit 130 may extract the third feature related to the diagonal coefficient matrix by performing the wavelet transform seven times and six times on the data with the preset size.

According to some exemplary embodiments of the present disclosure, the same result value may always be extracted for the third feature related to the diagonal coefficient matrix extracted by performing the wavelet transform on the data having the preset size eight times.

Specifically, the third feature may include at least one of a third-1 feature related to the ratio of the diagonal coefficient matrix extracted by performing the wavelet transforms the third number of times or the a third-2 feature related to a first standard deviation of the diagonal coefficient matrix extracted by performing the wavelet transform the third number of times. The ratio of the diagonal coefficient matrix may be a ratio that the diagonal coefficient matrix occupies in the wavelet coefficient matrices extracted by performing the wavelet transform on the data having the preset size. The first standard deviation of the diagonal coefficient matrix may be a standard deviation of the diagonal coefficient matrix extracted by performing the wavelet transform on data having a preset size. However, the result values of the third-1 feature and the third-2 feature extracted by performing the wavelet transform tight times on the data having the preset size by the signal processing unit 130 may be always fixed. The operation in which the signal processing unit 130 extracts the third-1 feature and the third-2 feature by performing the wavelet transform on the data with the preset size eight times may be wasteful in terms of resources. Accordingly, the signal processing unit 130 may extract the third feature related to the diagonal coefficient matrix by performing the wavelet transform the third number of times within the second number range less than the first number of times.

According to some exemplary embodiments of the present disclosure, the first threshold number of times may be determined based on the performance of the computing device 100. For example, when the performance of the computing device 100 is sufficient, the signal processing unit 130 may determine the first threshold number of times to be one time. When the first threshold number of times is one time, the second number range may be from seven times to one time, and thus the third number of times may be seven times, six times, five times, four times, three times, two times, and one time. As another example, when the performance of the computing device 100 is insufficient, the signal processing unit 130 may determine the first threshold number of times to be four times. If the first threshold number of times is four times, the second number range may be from seven times to four times, and thus the third number of times may be seven times, six times, five times, and four times.

The feature information may include a fourth feature related to a diagonal coefficient matrix extracted by performing the wavelet transform a fourth number of times within a third number range that is equal to or greater than the second threshold number of times less than the first threshold number of times and is less than the first number of times.

As an example, the first number of times may be eight times, the first threshold number of times may be seven times, and the second threshold number of times may be one time. In this case, the second number range may be seven times to one time, and the fourth number of times may be seven times, six times, five times, four times, three times, two times, and one time. Accordingly, the signal processing unit 130 may extract a fourth feature related to the diagonal coefficient matrix by performing the wavelet transform seven times, six times, five times, four times, three times, two times, and one time on the data with the preset size.

According to some exemplary embodiments of the present disclosure, the same result value may always be extracted for the fourth feature related to the diagonal coefficient matrix extracted by performing the wavelet transform on the data having the preset size eight times.

In particular, the fourth feature may include at least one of a fourth-1 feature related to the sum of the values of the diagonal coefficient matrixes extracted by performing the wavelet transform the fourth number of times, a fourth-2 feature related to the degree of asymmetry of the values of the diagonal coefficient matrixes extracted by performing the wavelet transform the fourth number of times, a fourth-3 feature related to a second standard deviation of the diagonal coefficient matrixes extracted by performing the wavelet transform the fourth number of times, a fourth-4 feature related to a total average value of the diagonal coefficient matrixes extracted by performing the wavelet transform the fourth number of times, and a fourth-5 feature related to a histogram percentage of the diagonal coefficient matrixes extracted by performing the wavelet transform the fourth number of times. The sum of the values of the diagonal coefficient matrix may be the sum of the values of the diagonal coefficient matrix extracted by performing the wavelet transform on the data having the preset size. The degree of asymmetry of the values of the diagonal coefficient matrix may be the degree of asymmetry of values of the diagonal coefficient matrixes extracted by performing the wavelet transform on the data having the preset size. The second standard deviation of the diagonal coefficient matrix may be a standard deviation of the diagonal coefficient matrix extracted by performing the wavelet transform on the data having the preset size. The average value of the diagonal coefficient matrix may be an average value of all values of the diagonal coefficient matrix extracted by performing the wavelet transform on the data having the preset size. However, the fourth-1 feature extracted by the signal processing unit 130 by performing the wavelet transform eight times on the data having the preset size and the second feature of the diagonal coefficient matrix value extracted by the signal processing unit 130 by performing the wavelet transform eight times on the data with the preset size may be the same. A fourth-2 feature, a fourth-3 feature, a fourth-4 feature, and a fourth-5 feature extracted by the signal processing unit 130 by performing the wavelet transform eight times on the data with the preset size are always the same result value. Specifically, the fourth-2 feature relates to the degree of asymmetry, the fourth-3 feature relates to the standard deviation, the fourth-4 feature relates to the average value, and the fourth-5 feature relates to the histogram percentage, and the result value extracted by performing the wavelet transform eight times always have only one value. Accordingly, the operation of extracting, by the signal processing unit 130, the fourth feature by performing the wavelet transform on the data with the preset size eight times may be wasteful in terms of resources. Therefore, the signal processing unit 130 may extract the fourth feature related to the diagonal coefficient matrix extracted by performing the wavelet transform the fourth number of times.

In the present disclosure, the feature information may include a fifth feature related to data with a preset size on which the wavelet transform is not performed. As an example, the fifth feature may include a fifth-1 feature related to a histogram percentage of data with a preset size, a fifth-2 feature related to a standard deviation of data with a preset size, and a fifth-3 feature related to a total standard deviation of data with a preset size.

As described above, the signal processing unit 130 may extract various types of feature information from the input data based on the wavelet coefficient matrix. The extracted feature information may be used as training data for the network model trained to detect malicious codes from input data. Therefore, the network model may be trained to detect and predict the malicious code with high accuracy.

FIG. 8 is a simple and general schematic diagram illustrating an example of a computing environment in which exemplary embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multiprocessor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

MODE FOR CARRYING OUT THE INVENTION

As described above, the relevant content has been described in the best mode for carrying out the invention.

INDUSTRIAL APPLICABILITY

The present disclosure may be used for devices and programs that detect whether input data is a malicious code by using the feature information extracted through the static feature information extraction process in order to quickly extract feature information of a binary file.

The invention claimed is:

1. A method of extracting file feature information, the method being performed by a computing device including at least one processor, the method comprising:
converting input data in a form of a binary file into data with a preset size, wherein the converting of the input data in the form of the binary file into the data with the preset size comprises:
recognizing the input data in units of bytes;
counting the number of each of the recognized plurality of bytes; and
converting the input data into the data with the preset size based on the number of each of the plurality of bytes;
extracting feature information of the input data from the data with the preset size; and
training a network model using the feature information as training data to detect a malicious code from the input data in the form of the binary file,
wherein the converting of the input data into the data with the preset size based on the number of each of the plurality of bytes comprises:
calculating an appearance probability of each of the plurality of bytes in total data based on the number of each of the plurality of bytes; and
converting the input data into the data with the preset size based on the appearance probability.

2. The method of claim 1, wherein the converting of the input data in the form of the binary file into the data with the preset size includes converting the input data into the data with the preset size by using a hidden Markov model.

3. The method of claim 1, wherein the converting of the input data in the form of the binary file into the data with the preset size includes:
recognizing the input data by dividing the input data by a first unit indicating a size of a storage device;
counting the number of data recognized by the first unit; and
converting the input data into the data with the preset size based on the number of data in the first unit.

4. The method of claim 1, wherein the converting of the input data in the form of the binary file into the data with the preset size includes:
recognizing the input data in units of bytes;
calculating the number of times of appearance of a unique concatenation structure between bytes in which a second byte is concatenated after a first byte among a plurality of recognized bytes, in which the number of times of the appearance is calculated for at least some of the recognized plurality of bytes; and
converting the input data into the data with the preset size based on the number of times of the appearance.

5. The method of claim 4, wherein the converting of the input data into the data with the preset size based on the number of times of the appearance includes:
calculating a concatenation probability between bytes, in which the second byte appears after the first byte, based on the number of times of the appearance; and
converting the input data into data with the preset size based on the concatenation probability.

6. The method of claim 1, wherein the extracting of the feature information of the input data from the data with the preset size includes:
extracting feature information from the data with the preset size by using a wavelet transform technique.

7. The method of claim 6, wherein the extracting of the feature information from the data with the preset size by using the wavelet transform technique includes:

extracting a wavelet coefficient matrix by performing the wavelet transform on the data with the preset size, in which the wavelet coefficient matrix includes an approximation coefficient matrix and a detail coefficient matrix; and extracting feature information of the input data based on the wavelet coefficient matrix.

8. The method of claim 7, wherein the detailed coefficient matrix includes at least one of a horizontal coefficient matrix, a vertical coefficient matrix, or a diagonal coefficient matrix.

9. The method of claim 8, wherein the data with the preset size is data having a matrix structure, and wherein the feature information includes at least one of:
a first feature related to the approximate coefficient matrix extracted by performing a first number of times of the wavelet transform;
a second feature for the diagonal coefficient matrix value extracted by performing a second number of times of the wavelet transform within a first number range equal to or greater than a first threshold number of times and equal to or less than the first number of times;
a third feature related to the diagonal coefficient matrix extracted by performing a third number of times of the wavelet transform within a second number range equal to or greater than a first threshold number of times and less than the first number of times; and
a fourth feature related to the diagonal coefficient matrix extracted by performing a fourth number of times of the wavelet transform within a third number range equal to or greater than a second threshold number of times less than the first threshold number of times and less than the first number of times, so that the data with the preset size has a 1×1 matrix structure, and the first threshold number of times is smaller than the first number of times.

10. The method of claim 9, wherein the third feature includes at least one of:
a third-1 feature related to a ratio of the diagonal coefficient matrix extracted by performing the wavelet transform the third number of times; and
a third-2 feature related to a first standard deviation of the diagonal coefficient matrix extracted by performing the wavelet transform the third number of times.

11. The method of claim 9, wherein the fourth feature includes at least one of:
a fourth-1 feature related to a sum of the values of the diagonal coefficient matrixes extracted by performing the wavelet transform the fourth number of times;
a fourth-2 feature related to asymmetry of the value of the diagonal coefficient matrix extracted by performing the wavelet transform the third number of times;
a fourth-3 feature related to a second standard deviation of the diagonal coefficient matrix extracted by performing the wavelet transform the third number of times; and
a fourth-4 feature related to an average value of the diagonal coefficient matrixes extracted by performing the wavelet transform the third number of times.

12. A computing device for extracting file feature information, the computing device comprising:
a binary file converting unit for converting input data in a form of a binary file into data with a preset size,
wherein the converting of the input data in the form of the binary file into the data with the preset size comprises:
recognizing the input data in units of bytes;
counting the number of each of the recognized plurality of bytes; and
converting the input data into the data with the preset size based on the number of each of the plurality of bytes, and
wherein the converting of the input data into the data with the preset size based on the number of each of the plurality of bytes comprises:
calculating an appearance probability of each of the plurality of bytes in total data based on the number of each of the plurality of bytes; and
converting the input data into the data with the preset size based on the appearance probability; and
a signal processing unit for extracting feature information of the input data from the data with the preset size and training a network model using the feature information as training data to detect a malicious code from the input data in the form of the binary file.

13. A non-transitory computer readable medium including a computer program, wherein the computer program performs a method of extracting feature information of a file when being executed by one or more processors, the method comprising:
converting input data in a form of a binary file into data with a preset size,
wherein the converting of the input data in the form of the binary file into the data with the preset size comprises:
recognizing the input data in units of bytes;
counting the number of each of the recognized plurality of bytes; and
converting the input data into the data with the preset size based on the number of each of the plurality of bytes, and
wherein the converting of the input data into the data with the preset size based on the number of each of the plurality of bytes comprises:
calculating an appearance probability of each of the plurality of bytes in total data based on the number of each of the plurality of bytes; and
converting the input data into the data with the preset size based on the appearance probability;
extracting feature information of the input data from the data with the preset size; and
training a network model using the feature information as training data to detect a malicious code from the input data in the form of the binary file.

* * * * *